United States Patent
Porel et al.

(10) Patent No.: US 11,427,682 B2
(45) Date of Patent: Aug. 30, 2022

(54) CLASS OF SEQUENCE-DEFINED POLYMERS AND PREPARATION METHODS THEREOF

(71) Applicant: Indian Institute of Technology Palakkad (IIT Palakkad), Palakkad (IN)

(72) Inventors: Mintu Porel, Palakkad (IN); Pandurangan Nanjan, Palakkad (IN)

(73) Assignee: Indian Institute of Technology Palakkad (IIT Palakkad), Kozhippara (IN)

( * ) Notice: Subject to any disclaimer, the term of this patent is extended or adjusted under 35 U.S.C. 154(b) by 0 days.

(21) Appl. No.: 17/005,125

(22) Filed: Aug. 27, 2020

(65) Prior Publication Data
US 2021/0214502 A1    Jul. 15, 2021

(51) Int. Cl.
  *C08G 75/00*    (2006.01)
  *C08G 73/02*    (2006.01)

(52) U.S. Cl.
  CPC ......... *C08G 75/00* (2013.01); *C08G 73/0253* (2013.01)

(58) Field of Classification Search
  CPC .. C08G 75/00; C08G 73/0253; C07C 213/06; C07C 213/08; C07C 227/06; C07C 333/20; C07C 333/16; A62D 3/33; A62D 2101/08; B09C 1/08; B09C 2101/00
  See application file for complete search history.

(56) References Cited

U.S. PATENT DOCUMENTS

2015/0283417 A1\*  10/2015  Zhang ................... C07C 333/16
                                                                            588/404

\* cited by examiner

*Primary Examiner* — Shane Fang
(74) *Attorney, Agent, or Firm* — Convergence Intellectual Property Law P.C.; Jonathan Garfinkel

(57) ABSTRACT

The invention provides a new class of synthetic sequence-defined polymer (SDP) and a method of synthesizing the same. The synthetic sequence-defined polymers have dithiocarbamate incorporated to the backbone. The method introduces a functional group dithiocarbamate in the backbone by using a new support-free, protection-deprotection free three-component reaction strategy. Dithiocarbamate-SDP is prepared from a unique bifunctional monomer, $CS_2$ and chloroacetyl chloride. Chloracetyl chloride is used as a co-monomer. Different functional groups may be introduced in the dithiocarbamate-SDP via custom synthesis of monomers with the desired functional group, using the method disclosed. The SDPs may undergo modular post-synthetic modification through multiple paths. SDP is produced in multi-gram scale at low cost and in an eco-friendly manner through the method. No hazardous waste is produced in the process as HCl gas released from the reaction may be neutralized by bicarbonate in the medium.

8 Claims, 8 Drawing Sheets

CLASS OF SEQUENCE-DEFINED POLYMERS AND PREPARATION METHODS THEREOF

CROSS-REFERENCES TO RELATED APPLICATIONS

This application claims priority to Indian Patent Application No. 202041001701 filed on Jan. 14, 2020, the full disclosure of which is incorporated herein by reference.

FIELD OF THE INVENTION

The present invention relates to sequence-defined polymers, and a method of synthesizing a new class of synthetic sequence-defined polymers thereof.

DESCRIPTION OF RELATED ART

Sequence-defined polymer (SDP) is uniform chain of monomers where each monomer unit is at a defined position. Natural sequence-defined polymers are present in a living system as nucleic acids, and proteins with structural and functional complexity. Synthetic sequence-defined polymers possess a wider scope of unlimited functional groups at the side chain and backbone leading to extensive complexity and variable properties. Iterative synthesis is an efficient strategy to precisely control the monomer sequence of sequence-defined polymers in which the growing polymer chain is reacted with one desired monomer at a time, purified from the reaction debris and the cycle is repeated towards the addition of the next monomer. The two categories of this strategy include supported synthesis and support-free synthesis. In supported strategies, solid supported synthesis is an efficient strategy to build SDPs for its ease of purification and automation. However, the kinetics of the solid-supported coupling reaction is limited because of diffusion into solid support. Soluble-supported strategies have been developed to overcome that through solution phase homogenous kinetics. The other notable strategy is the support-free strategy which has added advantages including fast solution phase reaction kinetics as well as avoiding utilization of expensive support, attaching and removal step of the polymer from the support, any limitation arising from the support. However, it is challenging to have a precise control over the monomer sequence on a synthetic polymer backbone. Hence, limited number of support-free iterative strategies have been developed so far for SDP synthesis.

Dithiocarbamate (DTC) is a functional group in which the polar-sulphur group plays an important role in biological and material applications. In material applications, DTC is used in heavy metal sensor and vulcanizing accelerators in rubber industries and in biomedical applications as antileishmanial agents, anti-acute myelogenous leukemia agents, anti-trypanosomatids and agrochemicals including pesticides, fungicides and insecticides. Recently, it has been reported that brassinin-a natural dithiocarbamate from brassicaceae family is found to have anti-cancer properties and its derivative is effective against indoleamine 2,3-dioxygenase inhibition.

U.S. patent application US20160075831A1, discusses the methods of making sequence-defined polymers and their usage based on the orthogonal reactivity of monomers having at least two different functional groups. US20180244845A1, describes the process of preparing defined monomer sequence polymers in which a backbone portion of the polymer is first prepared by performing one or more sequential monomeric coupling reactions with intervening membrane diafiltration purification steps. U.S. Pat. No. 9,193,999B2, discloses the method of sequencing nucleic acid templates and high-density detection of nucleic acids by orthogonal synthesis. U.S. Pat. No. 3,372,129A, discusses the method of preparing relatively high molecular weight non-cyclic polyamines by a novel reaction of an amine and an alkylene dihalide. Another U.S. Pat. No. 5,164,095A discloses the preparation of water-soluble ethylene dichloride ammonia polymer having a molecular weight of from 500 to 1000 which contains from 5 to 50 mole % of dithiocarbamate salt groups.

Hence, there is a need for a low cost, eco-friendly sequence-defined polymers. The present invention discloses sequence-defined polymers and a method of synthesizing the same and thereby addresses some of the drawbacks of existing methods.

SUMMARY OF THE INVENTION

The invention in its various embodiments discloses a new class of synthetic sequence-defined polymers and a method of synthesizing the same.

In various embodiments, the synthetic sequence-defined polymer having dithiocarbamate backbone, represented as formula 1, is disclosed:

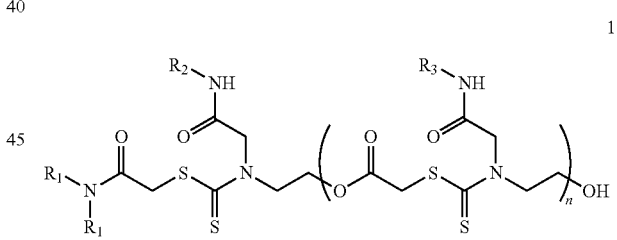

In various embodiments, the invention discloses a method for synthesizing a sequence-defined dithiocarbamate polymer of formula 1. In various embodiments, a support-free, protection-deprotection free, three component reaction strategy is used to synthesize the synthetic sequence-defined polymer of formula 1 as depicted in scheme 1 below.

Scheme 1: Synthesis of sequence-defined dithiocarbamate polymer

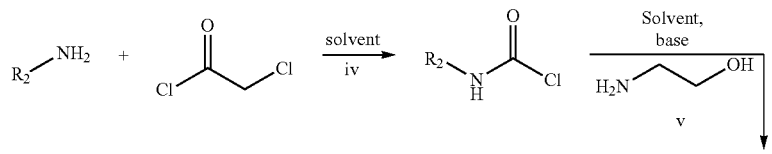

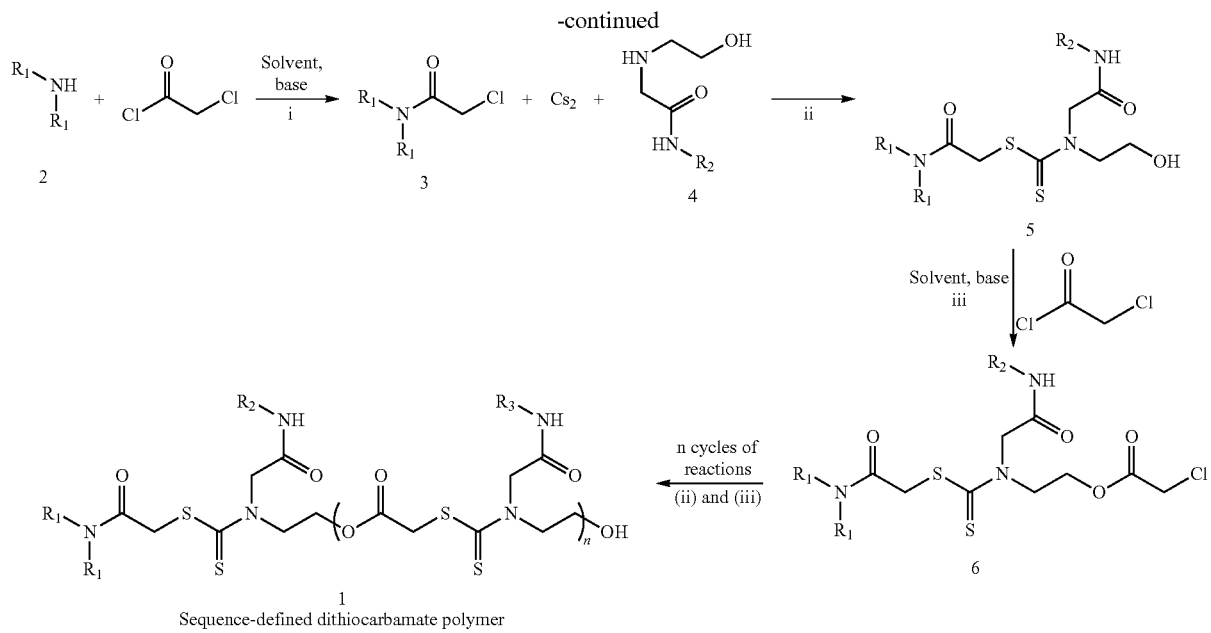

1
Sequence-defined dithiocarbamate polymer wherein, R1, R2, and R3 are independently different functional groups selected from linear, branched and cyclic alkane, alkene, alkyne, aromatic, or heterocyclic.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE EMBODIMENTS

Figure 1:
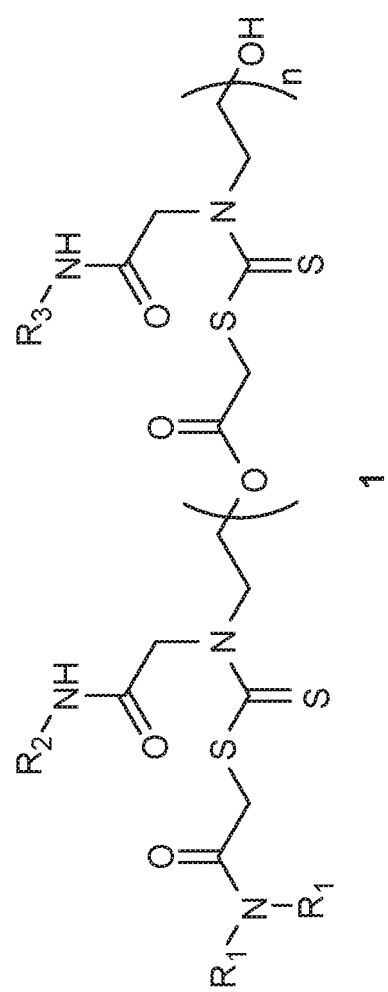
FIG. 1 shows the structure of sequence-defined dithiocarbamate polymer.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The invention in its various embodiments discloses a new class of synthetic sequence-defined polymers and a method of synthesizing the same. The synthetic sequence-defined polymers have dithiocarbamate incorporated to the backbone. The method introduces a functional group dithiocarbamate in the backbone by using support-free three-component reaction.

In various embodiments, the synthetic sequence-defined polymer, having dithiocarbamate backbone represented as formula 1, is disclosed:

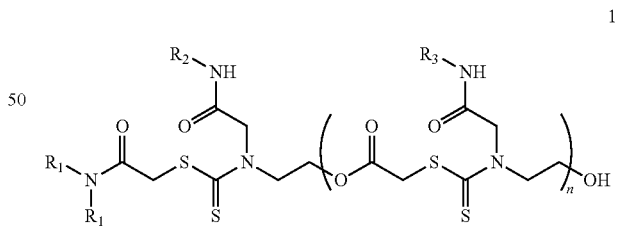

1 wherein, R1, R2, and R3 are independently different functional groups selected from linear, branched and cyclic alkane, alkene, alkyne, aromatic, or heterocyclic.

Figure 2:
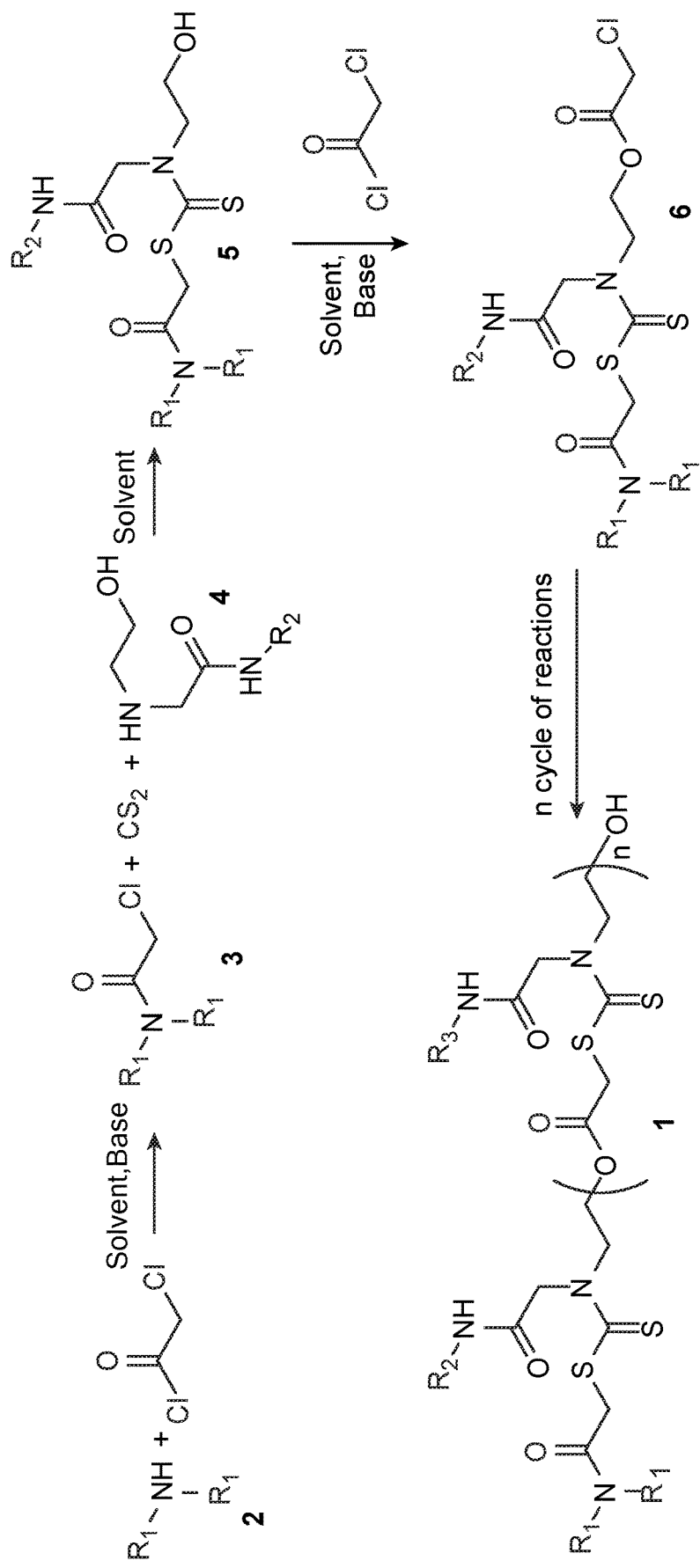
FIG. 2 illustrates a method of synthesizing sequence-defined dithiocarbamate polymers.

In various embodiments, the invention discloses a method for synthesizing a sequence-defined dithiocarbamate polymer of formula 1 as shown in FIG. 2. In various embodiments, a support-free system with a three-component reaction and a two-component reaction is used to synthesize the synthetic sequence-defined polymer of formula 1. The two reactions have precise control over the monomer sequence, various functional residues and dithiocarbamate backbone.

In various embodiments, an amine of formula 2 is reacted with chloroacetyl chloride in a solvent to provide a chloroacetyl amide of formula 3.

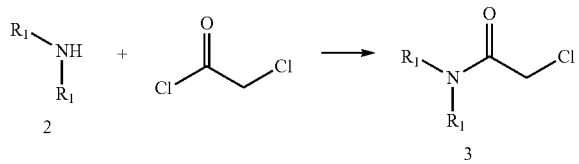

Wherein, R1 is selected from H, linear, branched, or cyclic alkane, alkyne, aromatic, or heterocyclic.

In one embodiment, when one of the R1 groups in formula 2 is H and the other R1 group is selected from linear, branched, or cyclic alkane, alkyne, aromatic, or heterocyclic. The amine of formula 2 is a primary amine.

In one embodiment, when both the R1 groups in formula 2 are selected from linear, branched, or cyclic alkane, alkyne, aromatic, or heterocyclic. The amine of formula 2 is a secondary amine.

The solvent used for synthesis of compound of formula 3 may be selected from formamide, dialkylformamide, alcohol, nitriles, halogenated aliphatic hydrocarbons or mixtures thereof.

When the compound of formula 2 is a secondary amine, the synthesis of compound of formula 3 is carried out in presence of a base selected from alkali metal carbonate, triethylamine, N,N-diisopropyl ethyl amine, trimethyl amine.

In various embodiments, when formula 2 is a primary amine, reaction of the primary amine and chloroacetyl chloride to provide a chloroacetyl amide of formula 3 is carried out at room temperature for one hour in solvent.

In various embodiments, the chloroacetyl amide of formula 3 is reacted with ethanolamine to provide an amine-hydroxyl monomer of formula 7.

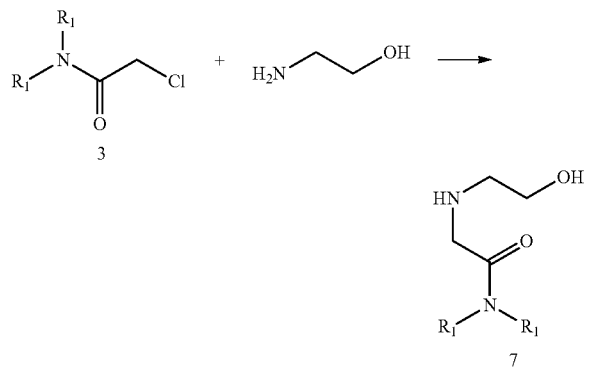

wherein, R1 is selected from H, linear, branched and cyclic alkane, alkene, alkyne, aromatic, or heterocyclic, when one of the R1 groups is —H, the amine of formula 2 is a primary amine.

In various embodiments, the reaction of the primary amine of formula 2, chloroacetyl chloride and ethanolamine provides a bifunctional amine-hydroxyl monomer of formula 7. The bifunctional monomer has a secondary amine and a hydroxyl group to provide reactive sites for two reactions. The solvents used in this reaction may be selected from methanol, formamide, dialkylformamide or nitrile. In various embodiments the nitrile is selected from acetonitrile or propionitrile.

In various embodiments, the reaction of chloroacetyl amide of formula 3, which is a 2-mer, with ethanolamine is carried out at a temperature of 85° C. for an hour in solvent.

In various embodiments, the chloroacetyl amide of formula 3 is reacted with carbon di-sulphide ($CS_2$) and a bifunctional amino-hydroxyl monomer of formula 4 in a solvent to provide a 3-mer of formula 5.

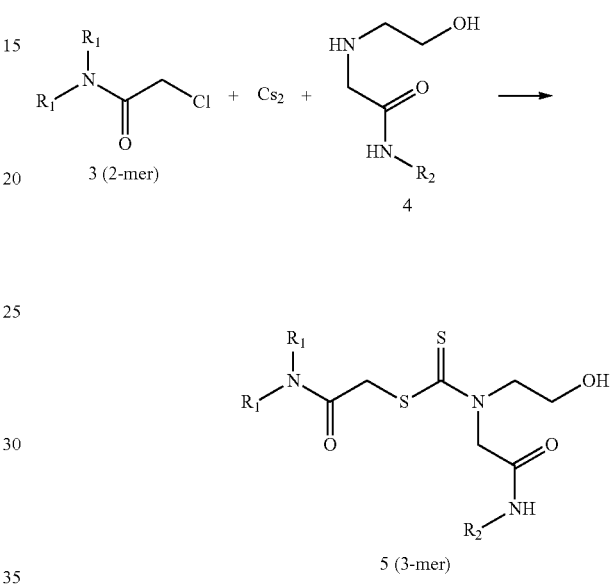

The synthesis reaction of 3-mer is carried out in solvent polyethylene glycol-200 (PEG-200) at room temperature for an hour. In various embodiments the bifunctional monomer is formed from a primary amine. In various embodiments, according to the three-component strategy, the first reaction between secondary amine of bifunctional monomer and $CS_2$ generates active thiol. The second reaction involves nucleophilic substitution of chloride by the active thiol generated in the first reaction. In this reaction condition hydroxyl group of the monomer is inactive for active thiol generation. The hydroxyl group was reacted with the acyl chloro group of the chloroacetyl chloride to form an ester linkage of the sequence-defined polymers.

In various embodiments, the 3-mer of formula 5 is reacted with chloroacetyl chloride in a solvent, and in presence of a base to provide a compound of formula 6 which is a 4-mer.

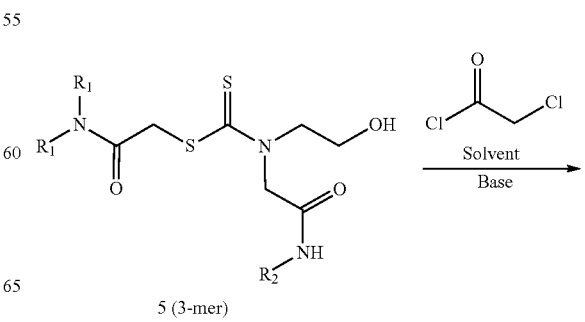

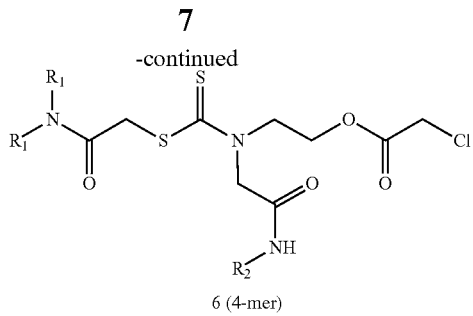

6 (4-mer)

wherein, R1≠R2, and R1 and R2 are independently different functional groups selected from linear, branched and cyclic alkane, alkene, alkyne, aromatic, or heterocyclic.

In various embodiments, chloroacetyl chloride is used as a co-monomer. Acetyl chloride of the co-monomer reacts with the hydroxyl group of the 3-mer. The reaction is carried out in a solvent selected from alcohol, formamide, dimethylformamide, nitriles, or halogenated aliphatic hydrocarbons, and in the presence of a base selected from alkali metal carbonate, triethylamine, N,N-diisopropylethylamine, pyridine, trimethylamine, or 1,8-diazabicyclo[5.4.0]undec-7-ene).

In various embodiments, the compound of formula 6 (4-mer) is reacted with a bifunctional monomer in presence of carbon di-sulfide to form a 5-mer of sequence-defined dithiocarbamate polymer.

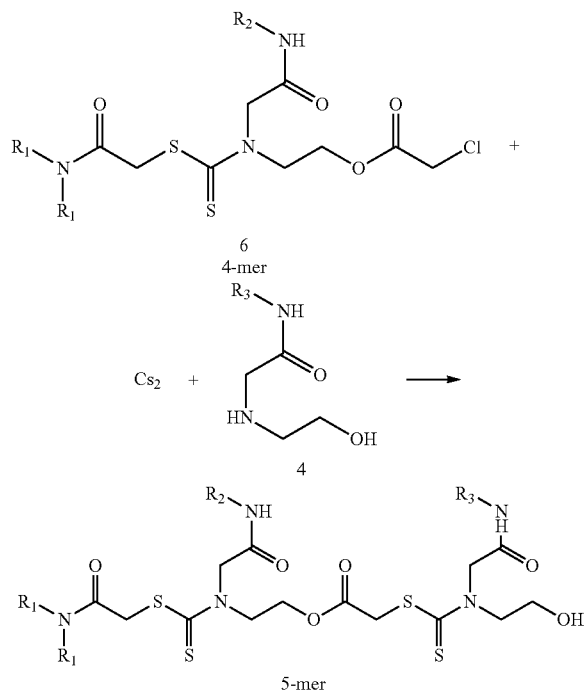

In one embodiment the n-mer is a polymer, wherein n is any number of polymer chain length. In various embodiments, the step of adding chloroacetyl chloride and a bifunctional monomer in presence of $CS_2$ to a n-mer is repeated to form a sequence-defined polymer of desired chain length.

In various embodiments, the product yield is at least 70%.

In various embodiments, various functional groups are incorporated in the dithiocarbamate sequence-defined polymer. In various embodiments, the monomers of desired functional group are produced using the method of synthesis. The synthetic strategy generates hydroxyl or chloro in terminal and alkyne in pendent as reactive functional groups which are used for post-synthetic modifications by secondary systems.

The advantages of the inventive methods include support-free synthesis with readily available inexpensive reactants at mild reaction conditions. The production of sequence-defined polymer is achievable in multi-gram scale with protection-deprotection free chemistry and fast synthetic strategy. The post-synthetic modifications facilitate the structural diversity and variable properties of the dithiocarbamate polymer. No hazardous waste is produced as HCl gas released from the reaction may be neutralized by bicarbonate in the medium.

Although the detailed description contains many specifics, these should not be considered as limiting the scope of the invention but merely as illustrating different examples and aspects of the invention. It should be appreciated that the scope of the invention includes other embodiments not discussed herein. Various other modifications, changes and variations which will be apparent to those skilled in the art may be made in the arrangement, operation and details of the system and method of the present invention disclosed herein without departing from the spirit and scope of the invention as described here. While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope.

EXAMPLES

A. General Synthesis of Monomer:

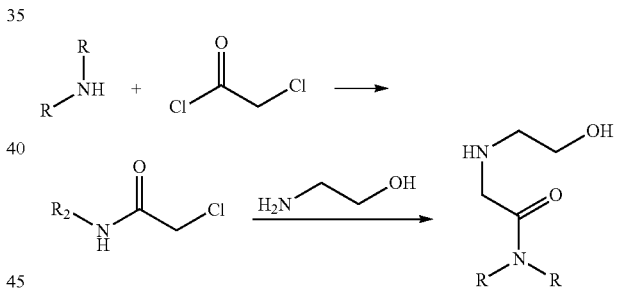

wherein, R is linear, branched and cyclic alkane, alkene, alkyne, aromatic, or heterocyclic.

Primary amine (1 mmol) was reacted with chloroacetyl chloride (1.5 mmol) in dimethylformamide (DMF) (5 mL). The reaction was carried out at 0° C. for initial 10 min, then the reaction mixture was brought to room temperature and continued for 1 hour at room temperature. After completion of the reaction (monitored by thin layer chromatography (TLC)), the excess chloroacetyl chloride was quenched by the addition of sodium bicarbonate ($NaHCO_3$). The reaction mixture was extracted in 1:1 ethyl acetate/water, ethyl acetate layer was dried over anhydrous $Na_2SO_4$ and the product was isolated from ethyl acetate layer. The solvent was removed under reduced pressure and chloroacetyl amides were obtained at good yield (90-95%) with high purity (>95%).

Chloroacetyl amides (1 mmol) was reacted with ethanolamine (5 mmol) in acetonitrile (5 mL). The reaction mixture was refluxed for 1 h. Thereafter, the reaction mixture was extracted in 1:1 ethyl acetate/water mixture. Ethyl acetate layer was dried over anhydrous $Na_2SO_4$. The solvent was removed under reduced pressure and product was obtained at good yield (85-90%) with >95% purity. Monomers were directly used for polymerization reaction without further purification.

B. General Synthesis of Dithiocarbamate Polymer:

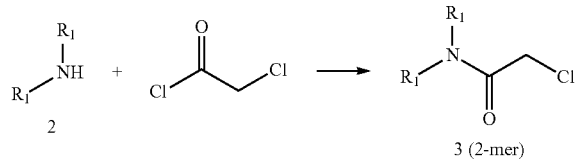

Step (a): 2-mer was synthesized by the reaction of substituted amines (1 mmol) and chloroacetyl chloride (1.5 mmol) in DMF (5 mL). The reaction was carried out at 0° C. for initial 10 min, then the reaction mixture was brought to room temperature and continued for 1 hour at room temperature. After completion of the reaction (monitored by TLC), the excess chloroacetyl chloride was quenched by the addition of sodium bicarbonate (NaHCO$_3$). The reaction mixture was extracted in 1:1 ethyl acetate/water, ethyl acetate layer was dried over anhydrous Na$_2$SO$_4$ and the product was isolated from ethyl acetate layer. The solvent was removed under reduced pressure and products were obtained at good yield (90-95%) with high purity (>95%).

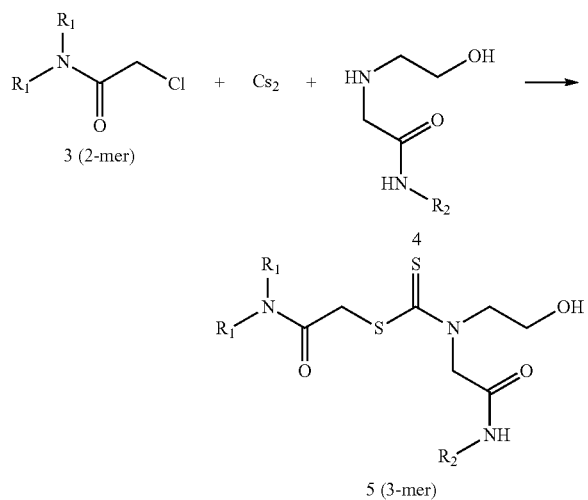

Step (b): 2-mer (1 mmol), the respective monomer (2 mmol) and CS$_2$ (4 mmol) were mixed in PEG-200 (1 mL). The reaction mixture was stirred at room temperature for 1 h. After completion of the reaction (monitored by TLC), the reaction mixture was extracted in 1:1 ethyl acetate/water mixture. The ethyl acetate layer was dried over anhydrous Na$_2$SO$_4$ and solvent was removed at reduced pressure. Products (3-mer) were obtained with good yields ranges from 80-90%.

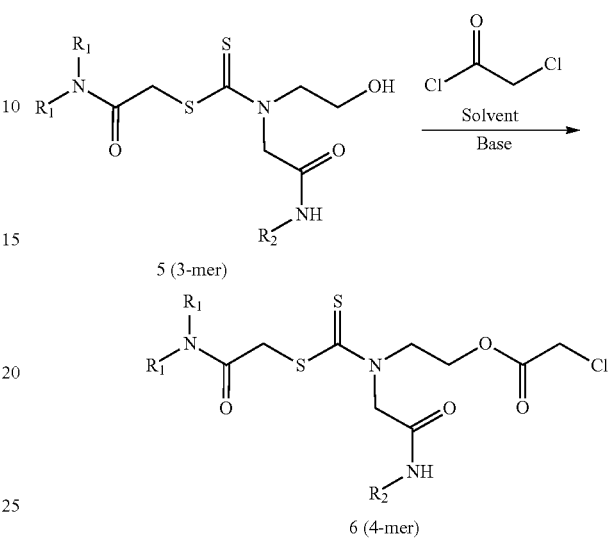

Step (c): The 4-mer was prepared by the reaction of 3-mer (1 mmol) and chloroacetyl chloride (2 mmol) in the presence of triethylamine (2 mmol) base and dichloromethane as solvent at room temperature. The other solvent can be used are methanol, dimethylformamide and acetonitrile. The other base can be used for this reaction are diisopropylethylamine, pyridine and 1,8-diazabicyclo[5.4.0]undec-7-ene. After the reaction (monitored by TLC), the excess chloroacetyl chloride was quenched by the addition of sodium bicarbonate (NaHCO$_3$). The dichloromethane was filtered through anhydrous Na$_2$SO$_4$ bed. The solvent was removed under reduced pressure and products were obtained in good yield (>90%). The 4-mer was taken directly to the next step reaction by without purification. Steps (b) and (c) are repeated to obtain n-mer sequence-defined dithiocarbamates polymer.

Example 1: Synthesis of a 9-Mer (V) of Sequence-Defined Polymer where, R1 is Phenyl Group, R2 is Cyclohexyl Group, R3 is Butyl Group, R4 is Benzyl Group, and R5 is Diethyl Amine Group

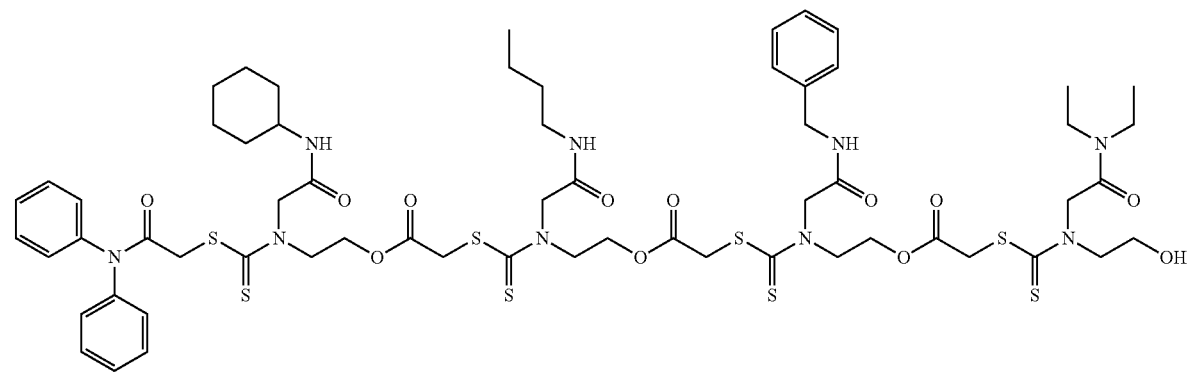

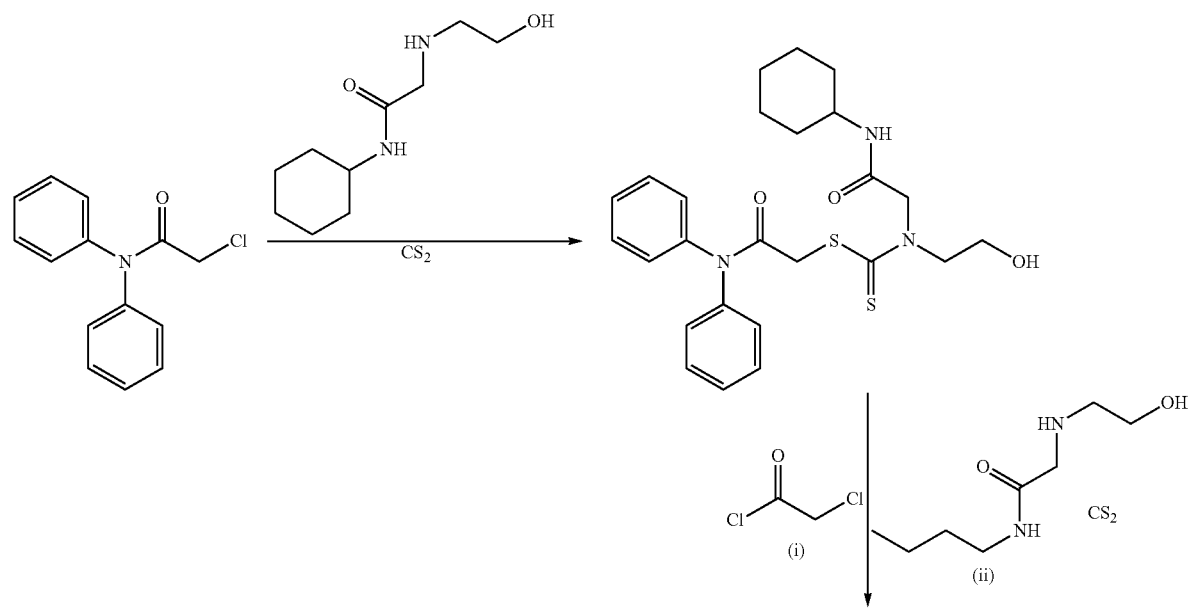
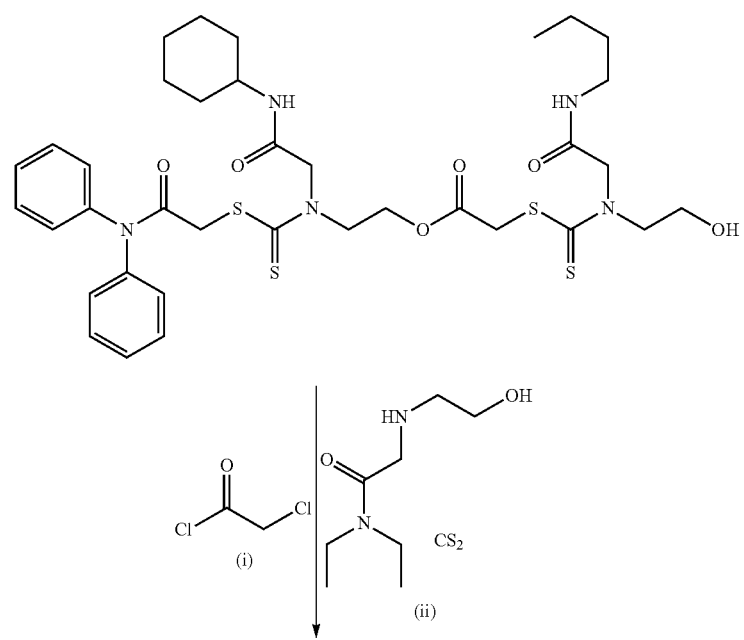

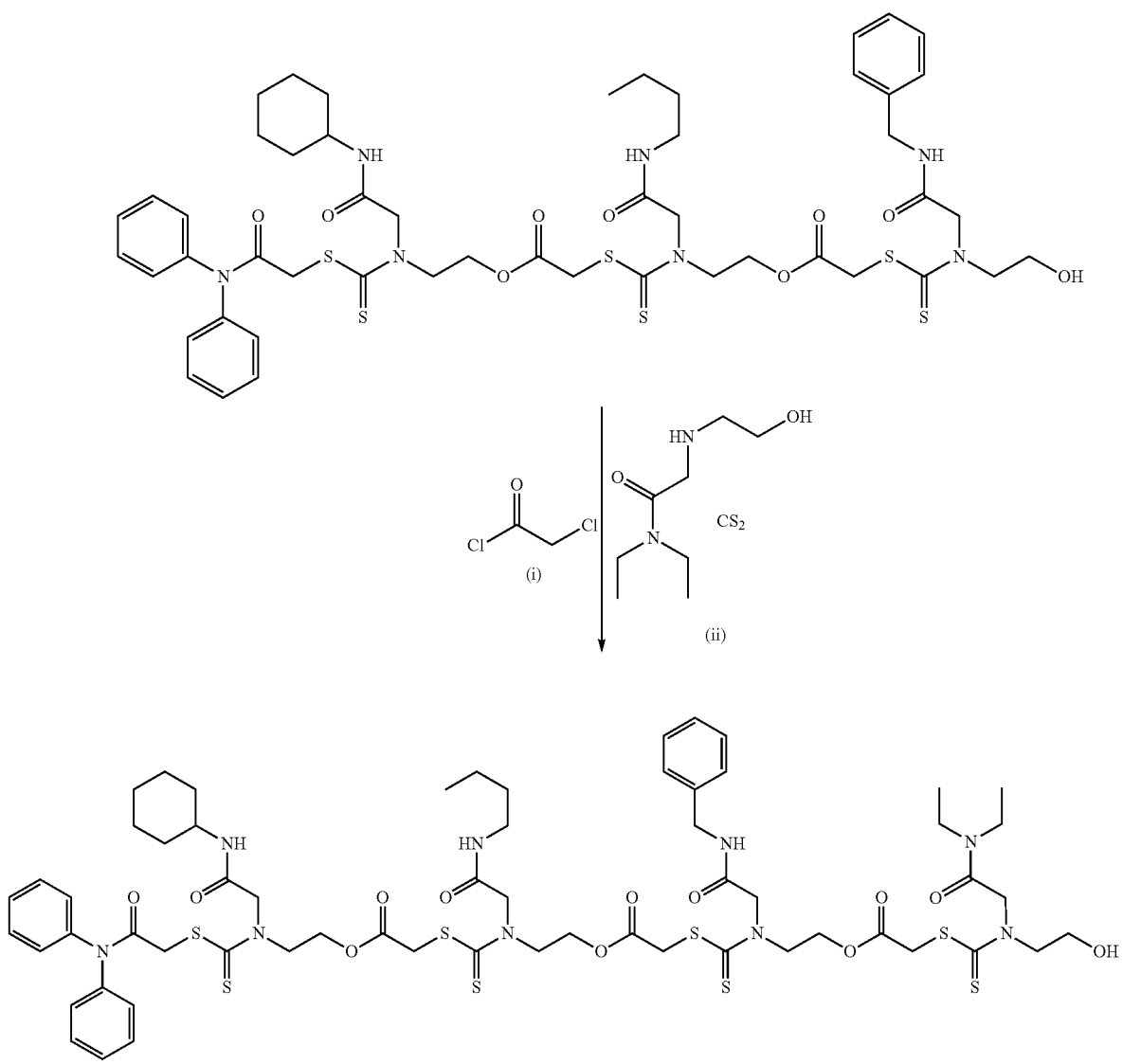

Step (a): Synthesis of N, N-diphenyl chloroacetyl amide (2-mer): N, N-Diphenyl amine (1 mmol) was reacted with chloroacetyl chloride (1.5 mmol) in 5 ml of dichloromethane (DCM) and triethylamine. The reaction was carried out at 0° C. for initial 10 min, then the reaction mixture was brought to room temperature and continued for 1 hour at room temperature. After completion of the reaction (monitored by TLC), the excess chloroacetyl chloride was quenched by the addition of sodium bicarbonate (NaHCO$_3$). The reaction mixture was extracted in 1:1 ethyl acetate/water, ethyl acetate layer was dried in anhydrous Na$_2$SO$_4$ and the product was isolated from ethyl acetate layer. The solvent was removed under reduced pressure and the product was used for the next step reaction without further purification.

Step (b): Synthesis of 3-mer: N.N-diphenyl chloroacetyl amide (1 mmol), cyclohexyl amine-hydroxyl monomer (2 mmol) and CS$_2$ (4 mmol) were mixed in PEG-200 (1 mL). The reaction mixture was stirred at room temperature for 1 h. In this reaction, initially secondary amine of the monomer and CS$_2$ generates active thiol. The active thiol underwent nucleophilic substitution with chloride of the N,N-diphenyl chloroacetyl amide. At room temperature the nucleophilic substitution occurs only in the presence of CS$_2$. The 3-mer was obtained at good yield and purity without column chromatography purification. The 3-mer showed expected mass at 486.20 Da [M+H]$^+$ in the mass spectrum FIG. 3. Cyclohexyl (δ 1-1.8 ppm) and aromatic protons (δ 7.3 to 7.4 ppm) were identified in $^1$H NMR spectroscopy as shown in FIG. 4A and FIG. 4B.

After completion of the reaction (monitored by TLC), the reaction mixture was extracted in 1:1 ethyl acetate/water mixture. The ethyl acetate layer dried over anhydrous Na$_2$SO$_4$ and solvent was removed at reduced pressure.

Step (c): Synthesis of 4-mer and 5-mer: The 3-mer was reacted with co-monomer chloroacetyl chloride to provide 4-mer in the presence of solvent dichloromethane and base triethylamine at room temperature. The conversion of hydroxyl derivative to chloro derivative was monitored by TLC by disappearance of the starting material and is utilized for the next reaction without purification.

The 4-mer was reacted with butyl amine-hydroxyl monomer and CS$_2$ at room temperature to provide a 5-mer. In this reaction, the secondary amine of the butyl monomer and CS$_2$ reacts to provide active thiol. The active thiol was reacted with the 4-mer to provide a 5-mer. The 5-mer showed expected molecular mass at 776.25 Da [M+H]$^+$ as shown in C, FIG. 3 and methyl protons of the butyl group (δ 0.8 ppm, triplet) were identified in the $^1$H NMR spectroscopy as shown in FIG. 4C.

Step (d): Synthesis of 6-mer and 7-mer: The 5-mer was reacted with co-monomer chloroacetyl chloride to form 6-mer followed by reacting with CS$_2$, and benzyl amine-hydroxyl monomer to provide a 7-mer. The 5-mer and chloroacetyl chloride reacted to provide the 6-mer in the presence of solvent dichloromethane and base triethylamine at room temperature. The monomer and CS$_2$ reacted to provide active thiol. The active thiol reacted with the 6-mer to provide a 7-mer. The 7-mer showed expected mass at 1100.10 Da [M+H]$^+$ in mass spectral analysis as shown in D, FIG. 3.

Step (e): Synthesis of 8-mer and 9-mer (V): The 7-mer was reacted with co-monomer chloroacetyl chloride (to form 8-mer) followed by reacting with CS$_2$ and diethyl amine-hydroxyl monomer to provide a 9-mer. The 7-mer and chloroacetyl chloride reacted to provide the 8-mer in the presence of solvent dichloromethane and base triethylamine at room temperature. The monomer and CS$_2$ reacted to provide active thiol. The active thiol was reacted with the 8-mer to provide a 9-mer (V).

Figure 3:
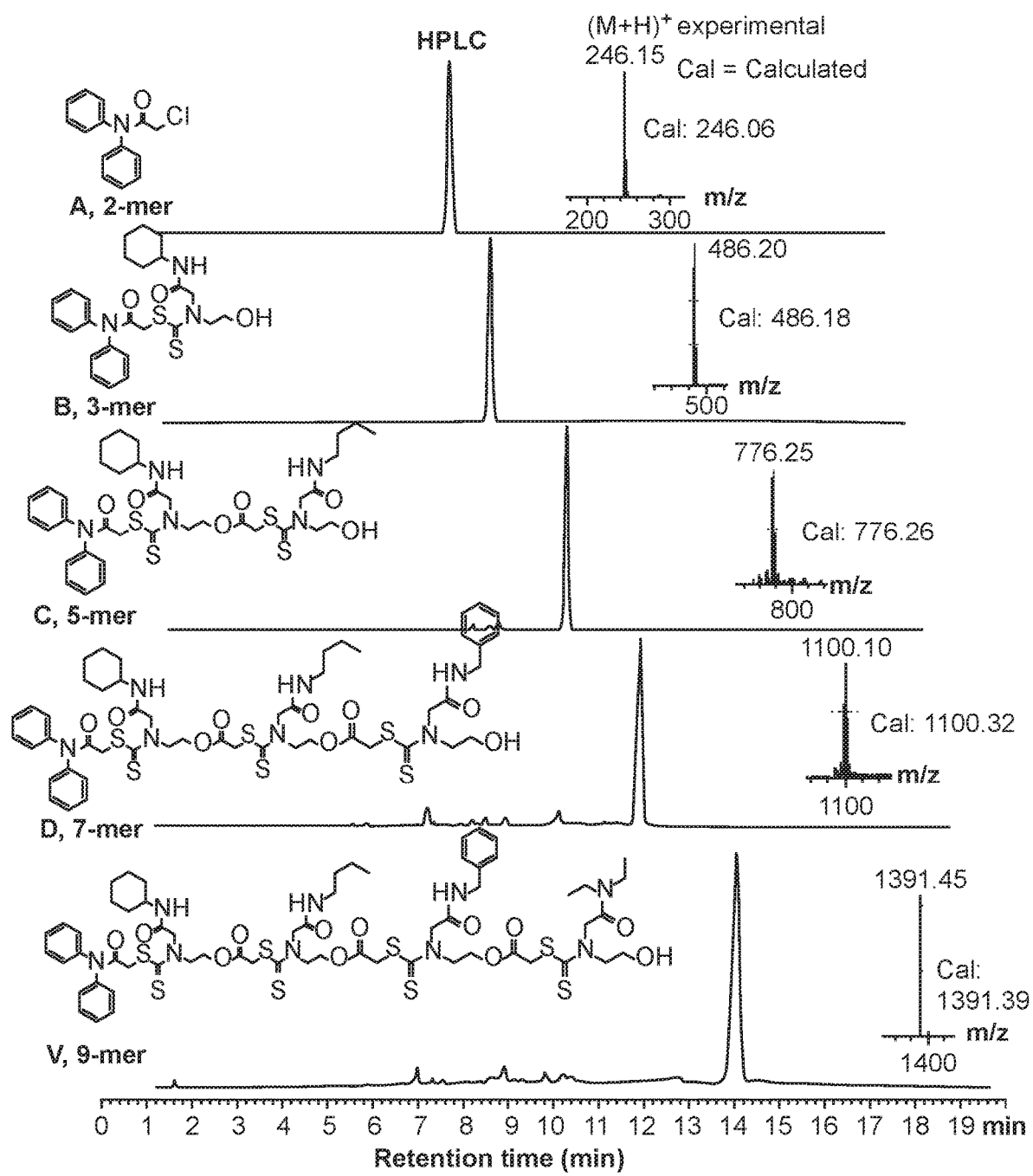
FIG. 3 illustrates the characterization of 2-mer, 3-mer, 5-mer, 7-mer and 9-mer by HPLC and MS analysis.
Figure 4A:
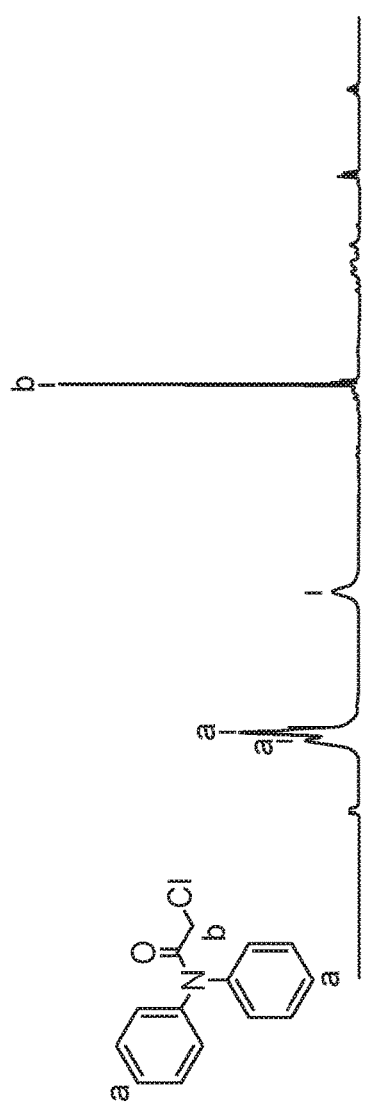
FIG. 4A depicts the $^1$H NMR spectra of aromatic protons.
Figure 4B:
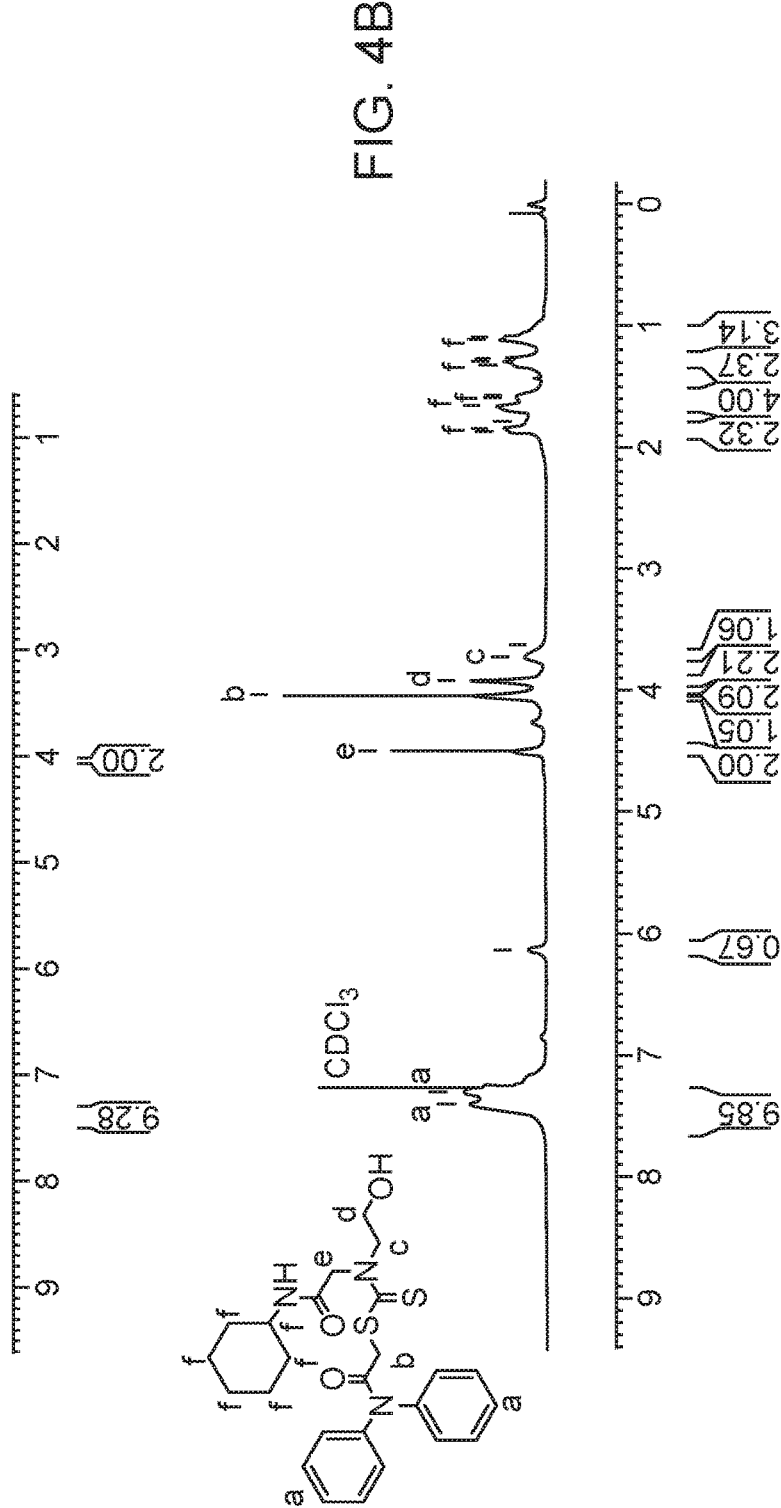
FIG. 4B depicts the $^1$H NMR spectra of aromatic and cyclohexyl protons.
Figure 4C:
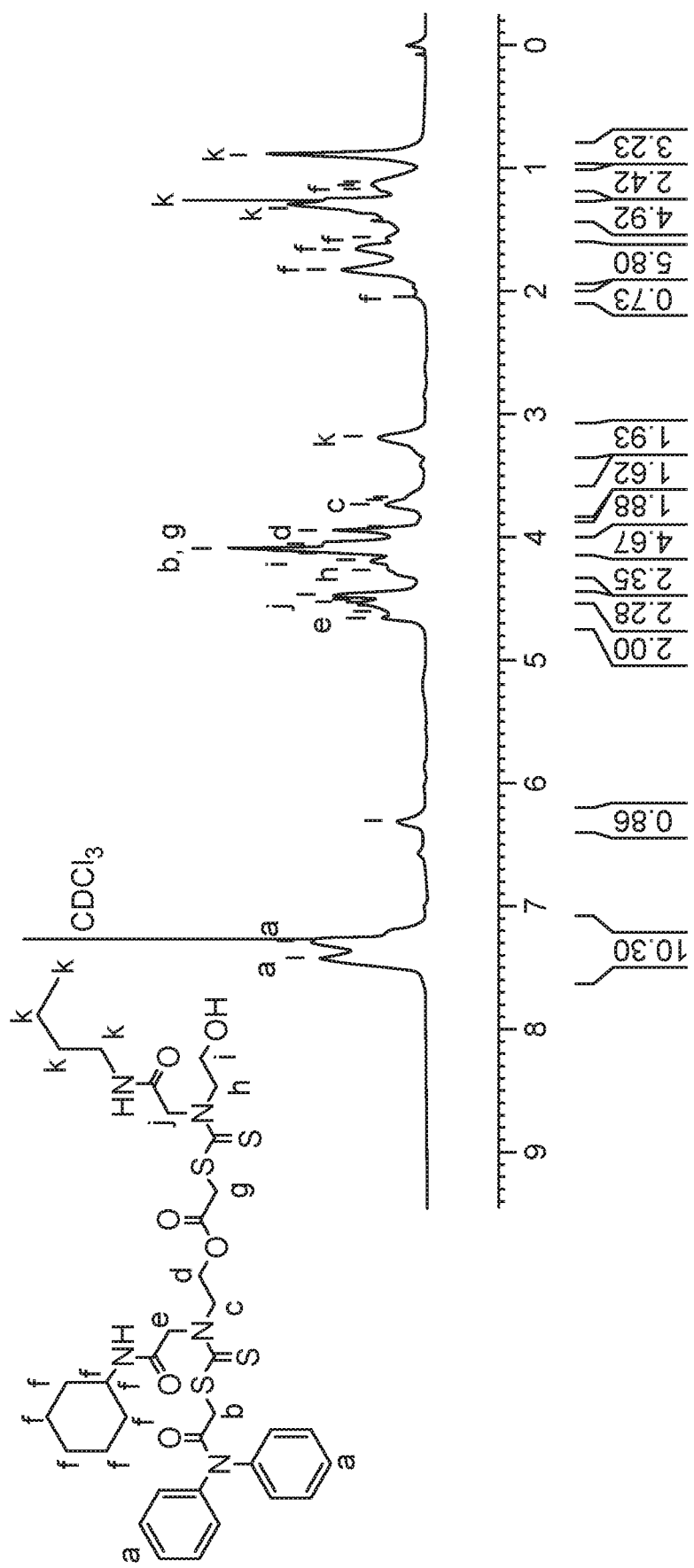
FIG. 4C depicts the $^1$H NMR spectra of aromatic, cyclohexyl and butyl protons.

The 9-mer showed expected mass at 1391.45 Da [M+H]$^+$ in the mass spectral analysis as shown in V, FIG. 3. The cycle of reactions from 2-mer to 9-mer were performed in the presence of solvents selected from polyethylene glycol-200, alcohol, dialkylformamide, nitrile selected from acetonitrile and propionitrile, or halogenated aliphatic hydrocarbons and bases used are selected from alkali metal carbonate, trimethylamine, N,N-diisopropylethylamine, pyridine, triethylamine, or 1,8-diazabicyclo[5.4.0]undec-7-ene). High-performance liquid chromatography (HPLC) traces of all the polymers indicate that hydrophobicity of dithiocarbamate polymers increased with the increase of their chain length as shown in FIG. 3.

Figure 5:
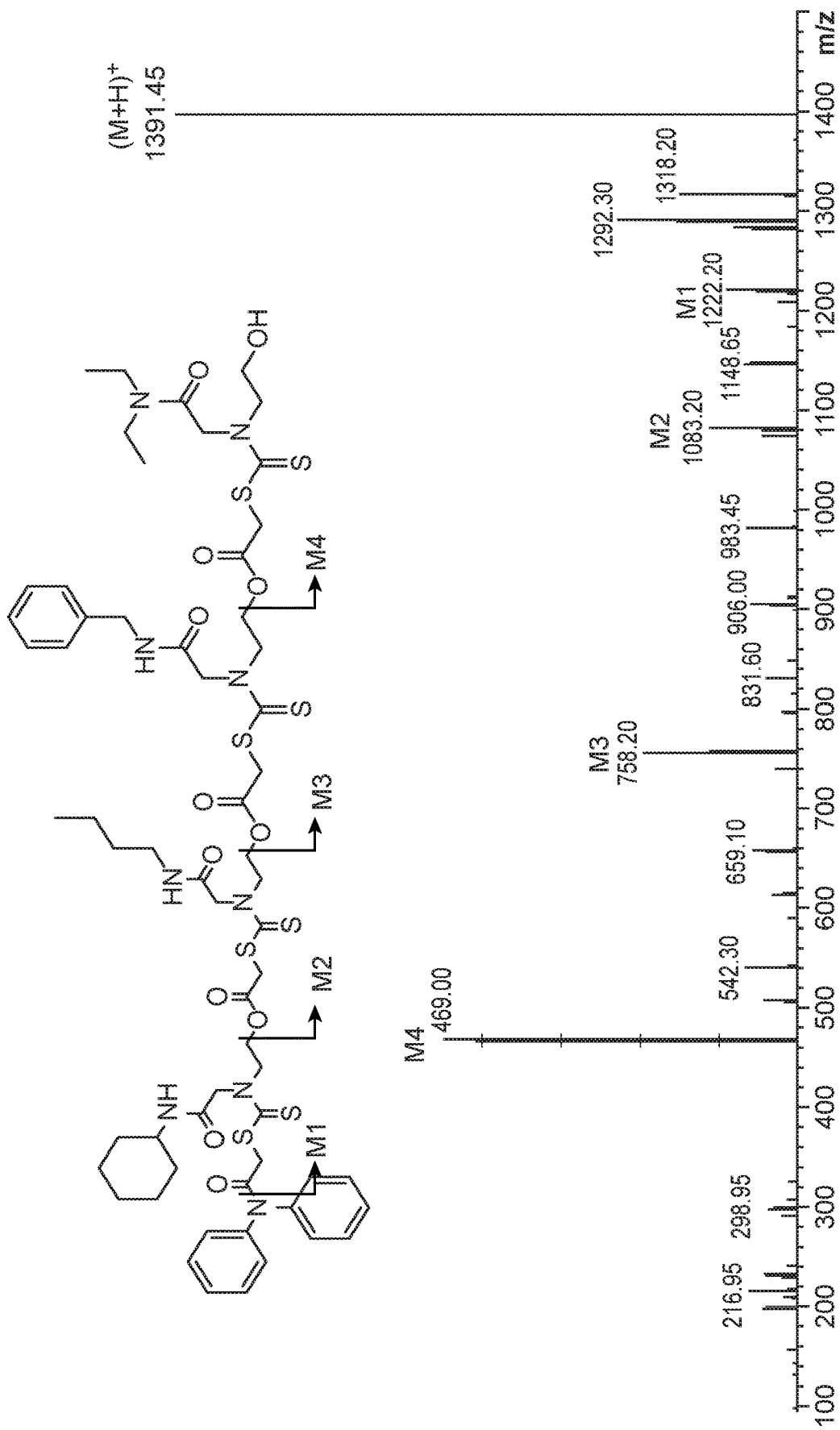
FIG. 5 shows the MS/MS analysis of 9-mer (V).

Sequence identification of the 9-mer was validated with Tandem MS (MS/MS) experiment on [M+H]$^+$ ion of the 9-mer as shown in FIG. 5. From the fragmentation analysis, it was identified that cleavage occurs between n-carbon of the dithiocarbamate-nitrogen and oxygen of the ester and corresponding fragment ion was the most prominent and consistent fragmentation pattern as shown in FIG. 5. The expected ion-peaks 1222.20, 1083.20, 759.20 and 469.00 were identified in MS/MS fragmentation spectrum as shown in FIG. 5 that confirmed the precisely arranged sequence of diphenyl, cyclohexyl, butyl, benzyl and N,N-diethyl functional groups on the 9-mer of dithiocarbamate (V).

Example 2: Synthesis of 9-Mer (Va) with R1=Diethyl Amine, R2=Butyl, R3=Cyclohexyl, R4=Benzyl, R5=Pyridine

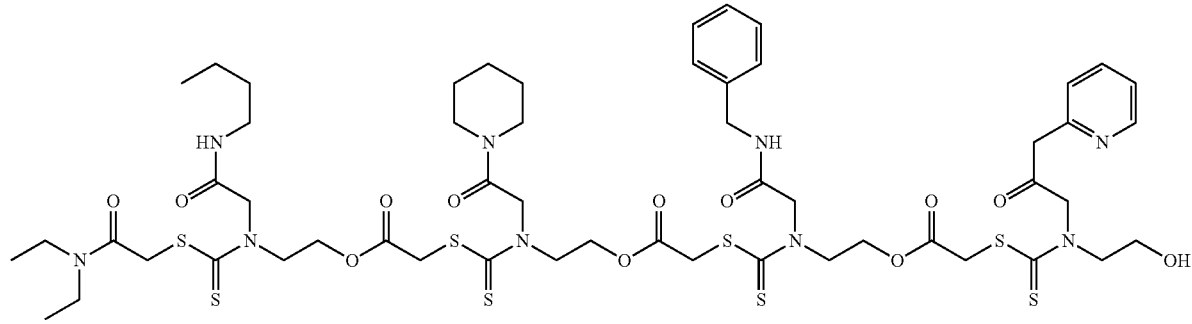

Va (a) Synthesis of N,N-Diethyl Chloroacetyl Amide (2-Mer)

N,N-Diethyl amine (1 mmol) was reacted with chloroacetyl chloride (1.5 mmol) in 5 ml of dichloromethane (DCM) and triethylamine. The reaction was carried out at 0° C. for initial 10 min, then the reaction mixture was brought to room temperature and continued for 1 hour at room temperature. After completion of the reaction (monitored by TLC), the excess chloroacetyl chloride was quenched by the addition of sodium bicarbonate (NaHCO$_3$). The reaction mixture was extracted in 1:1 ethyl acetate/water, ethyl acetate layer was dried in anhydrous Na$_2$SO$_4$ and the product was isolated from ethyl acetate layer.

(b) Synthesis of 3-Mer 2-mer (1 mmol), the butyl amine-hydroxyl monomer (2 mmol) and CS$_2$ (4 mmol) were mixed in PEG-200 (1 mL). The reaction mixture was stirred at room temperature for 1 h. After completion of the reaction (monitored by TLC), reaction mixture was extracted in 1:1 ethyl acetate/water mixture. The ethyl acetate layer was dried over anhydrous Na$_2$SO$_4$ and solvent was removed at reduced pressure to yield 3-mer.

(c) Synthesis of 4-Mer

The 4-mer was prepared by the reaction of 3-mer (1 mmol) and chloroacetyl chloride (2 mmol) in the presence of triethylamine (2 mmol) base and dichloromethane as solvent at room temperature. After the reaction (monitored by TLC), the excess chloroacetyl chloride was quenched by the addition of sodium bicarbonate (NaHCO$_3$). The DCM was filtered through anhydrous Na$_2$SO$_4$ bed. The solvent was removed under reduced pressure and products were obtained in good yield (>90%). The 4-mer was taken directly for the next step reaction without purification.

Steps (b) and (c) were repeated to obtain compound (Va) 9-mer.

Retention time of the Va 9-mer in High Performance Liquid Chromatography (HPLC) was observed as 10 min. Mass analysis for Va 9-mer showed the calculated [M+H]+ value as 1314.30 and observed [M+H]+ value as 1314.35.

Characterization of Different 9-Mer Sequence-Defined Dithiocarbamate Polymers

Five different 9-mer sequence-defined dithiocarbamate polymers (represented as V, Va, Vb, Vc, Vd) were synthesized as per general synthesis (B) described above, and were characterized by high performance liquid chromatography (HPLC) and mass analysis.

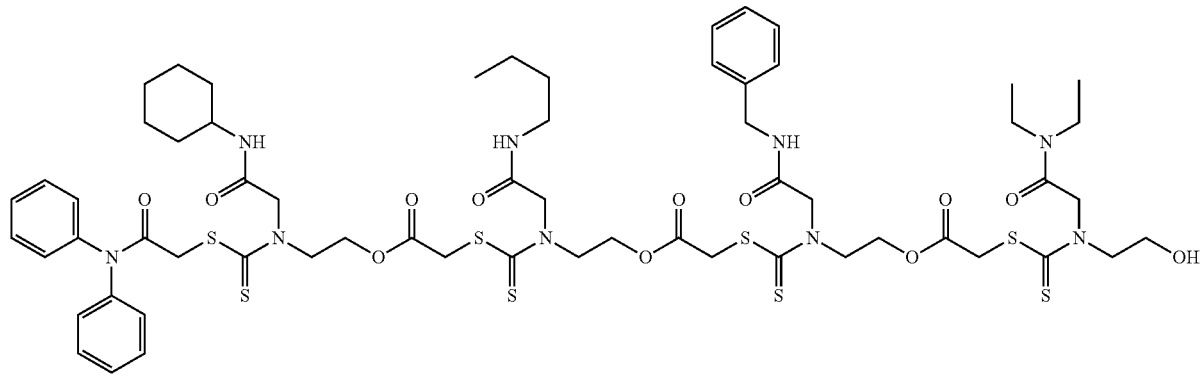

V

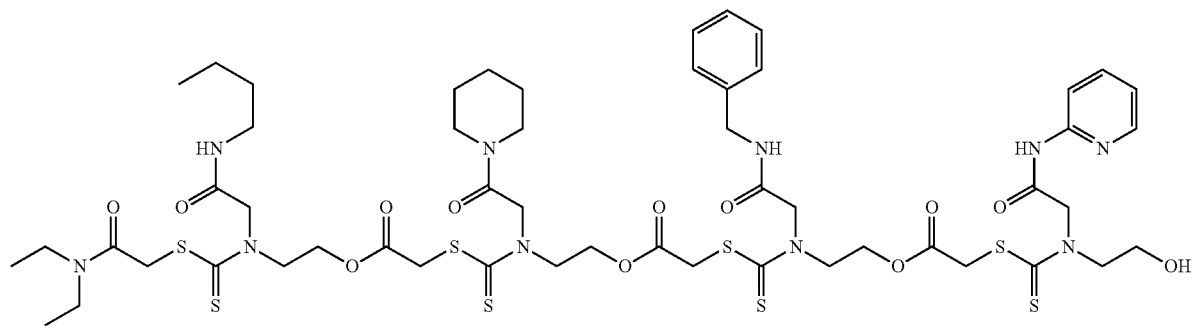

Va

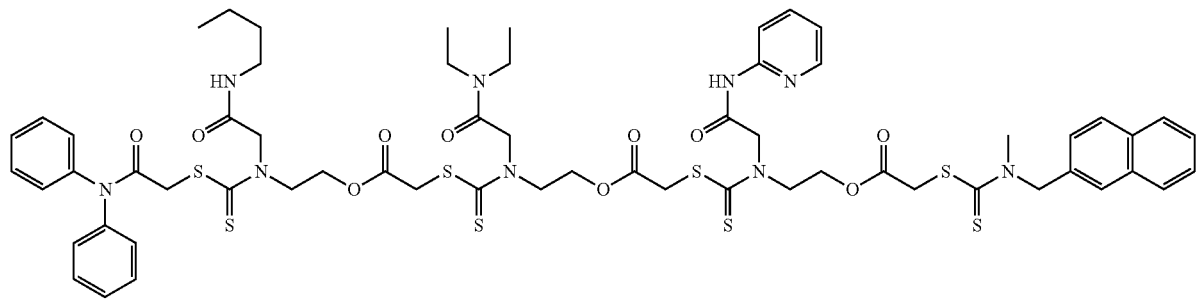

Vb

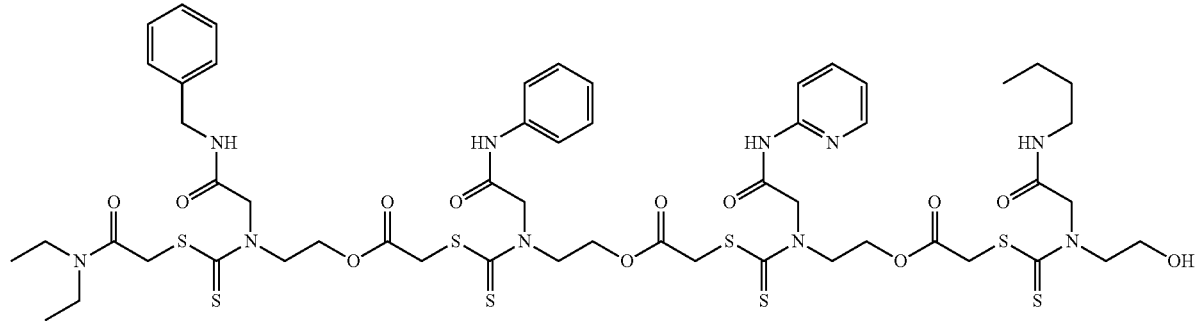

Vc

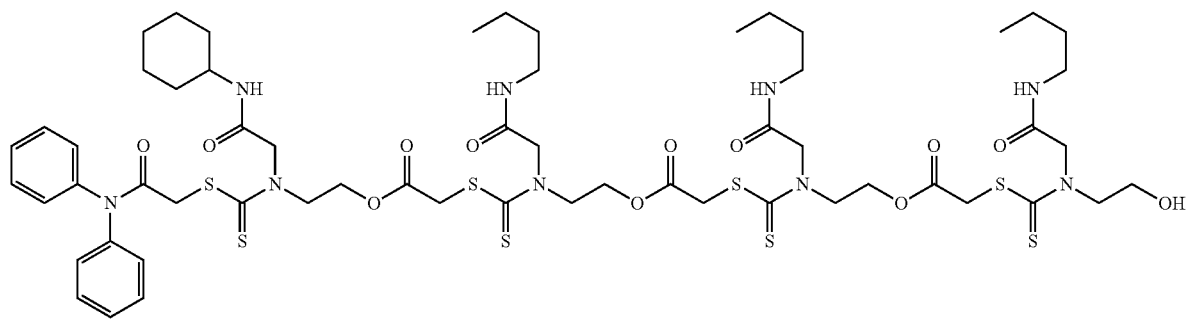

Vd

Figure 6A:
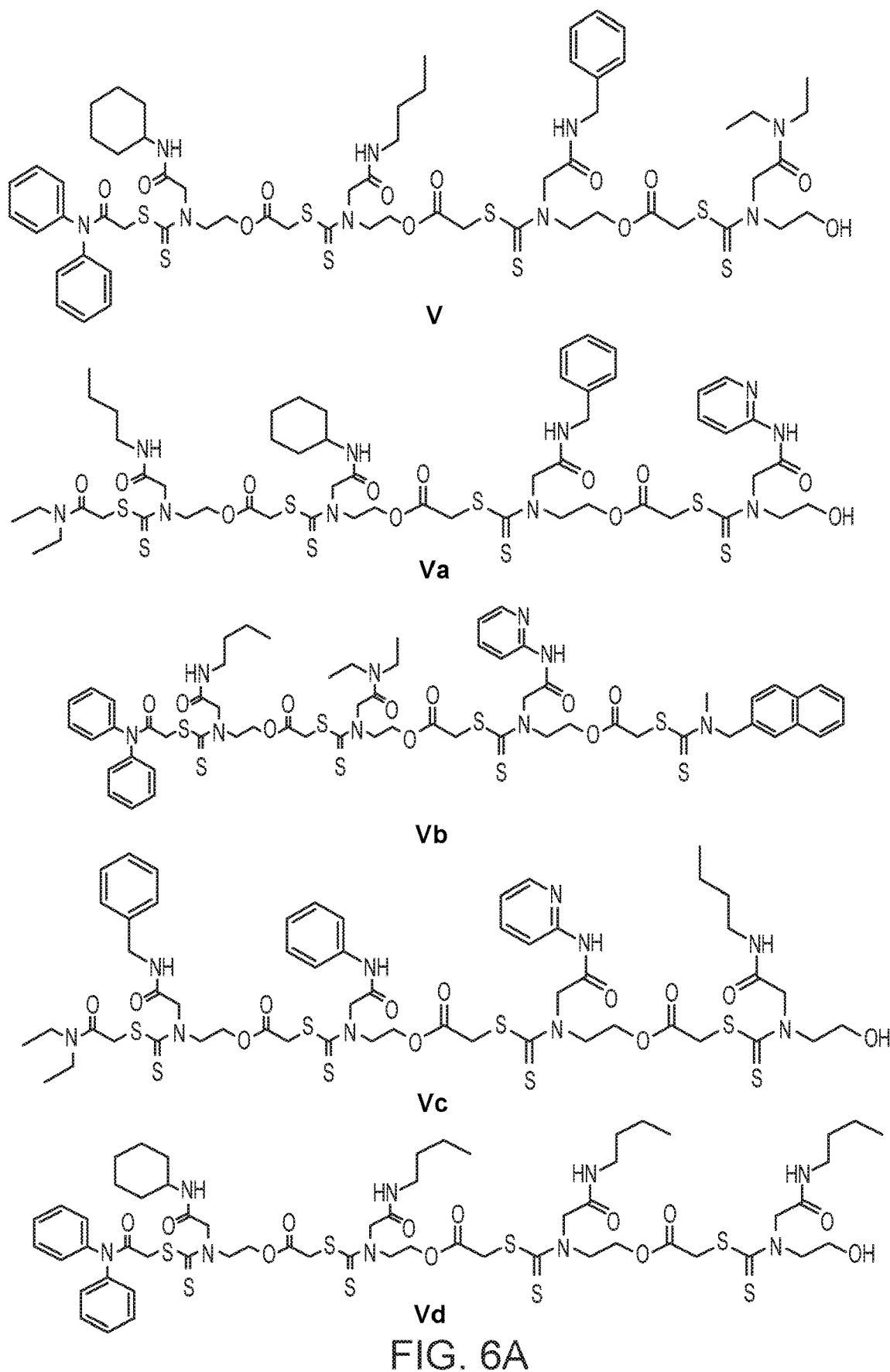
FIG. 6A shows different sequence-defined dithiocarbamate polymers changing the functional groups and their sequence.
Figure 6B:
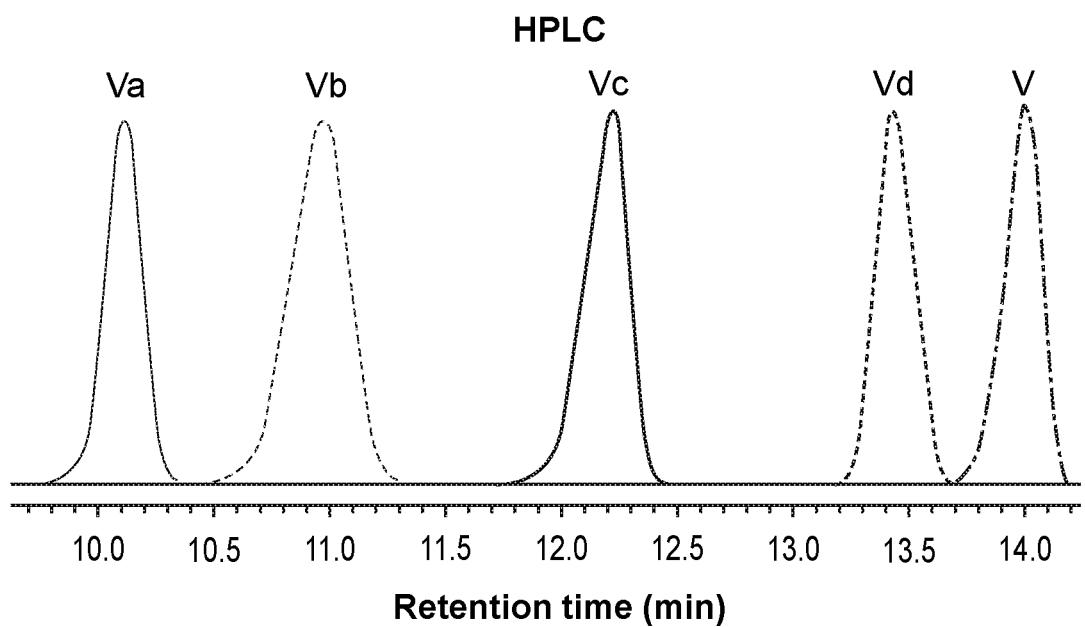
FIG. 6B shows characterization by HPLC and mass analysis of the polymers illustrated in FIG. 6A.

Traces of 5 different sequence-defined polymers from Va to V, as shown in FIG. 6A, indicates increased retention time. This indicates increased hydrophobicity from Va to V as retention time is directly proportional to hydrophobicity. The calculated and the observed mass of the 5 polymers (V, Va, Vb, Vc, Vd) are compared in Table. 1, which shows equality in calculated and observed mass of the 5 polymers.

TABLE 1

Characterization of the polymers by Mass spectra analysis

| Sr. No | $[M + H]^+$ (Da) (calculated) | $[M + H]^+$ (Da) (experimental) |
| --- | --- | --- |
| V | 1390.50 | 1390.45 |
| Va | 1314.30 | 1314.35 |
| Vb | 1347.30 | 1347.35 |
| Vc | 1308.30 | 1308.25 |
| Vd | 1355.41 | 1355.35 |

We claim:

1. A sequence-defined dithiocarbamate polymer of formula (1),

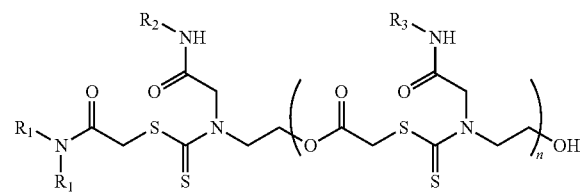

1 wherein, n is a number defining polymer chain length, and R1, R2, and R3 are independently different functional groups selected from linear, branched and cyclic alkane, alkene, alkyne, aromatic, or heterocyclic.

2. A method for synthesis of a sequence-defined dithiocarbamate polymer of formula (1) comprising:

a) reacting an amine of formula (2) with chloroacetyl chloride in a solvent to provide chloroacetyl amide (2-mer) of formula (3),

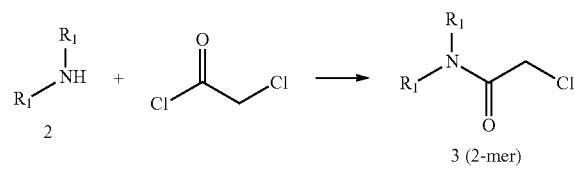

wherein, R1 is selected from linear, branched and cyclic alkane, alkene, alkyne, aromatic, heterocyclic etc., when one of the R1 groups is —H, the amine of formula (2) is a primary amine; when both the R1 groups are selected from linear, branched and cyclic alkane, alkene, alkyne, aromatic, heterocyclic etc. the amine of formula (2) is a secondary amine;

b) reacting the chloroacetyl amide of formula (3) with an ethanolamine in a solvent to provide amine-hydroxyl monomer of formula (7)

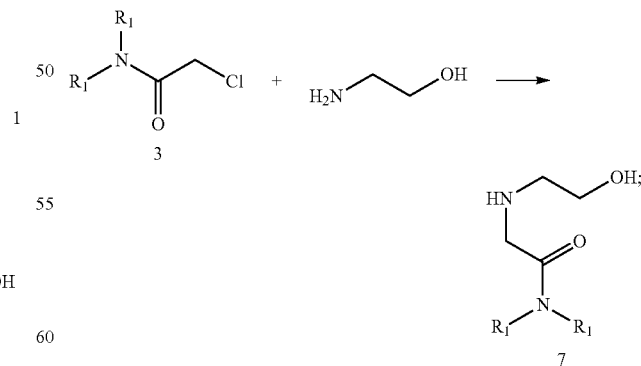

c) reacting the chloroacetyl amide of formula (3) with carbon di-sulphide ($CS_2$) and amine-hydroxyl monomer of formula (4) in a solvent to yield a 3-mer compound of formula (5),

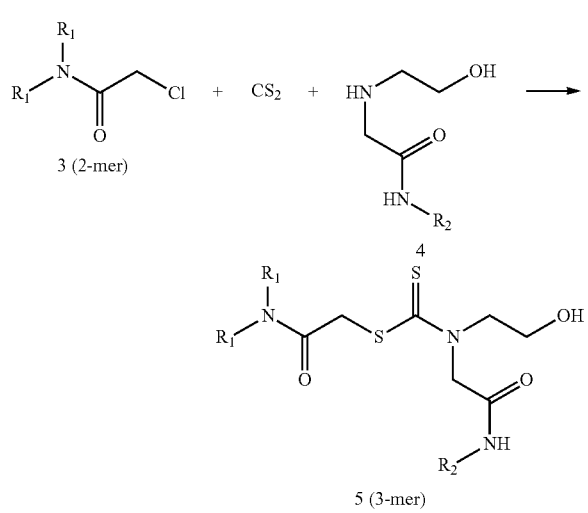

3 (2-mer)

4

5 (3-mer)

wherein, R1≠R2, R1 and R2 are selected from linear, branched and cyclic alkane, alkene, alkyne, aromatic, heterocyclic group;

d) reacting the 3-mer compound of formula (5) with chloroacetyl chloride in a solvent in presence of a base to provide 4-mer of formula (6),

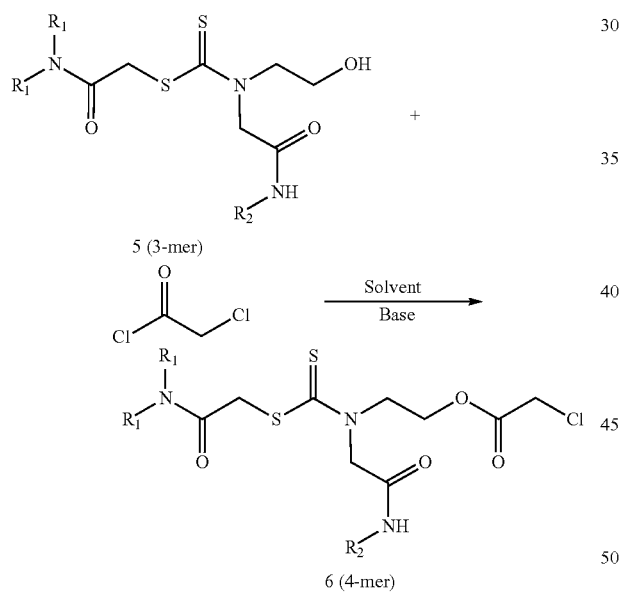

5 (3-mer)

6 (4-mer)

wherein, R1≠R2, and R1 and R2 are independently different functional groups selected from linear, branched and cyclic alkane, alkene, alkyne, aromatic, or heterocyclic; and e) repeating steps (c) to (d) to synthesize n-mer of dithiocarbamate polymer

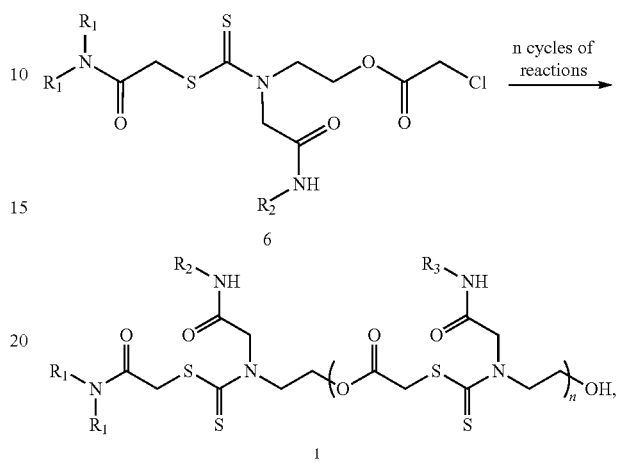

6

1 wherein n is a number defining polymer chain length.

3. The method as claimed in claim 2, wherein the solvent used in step (a) is selected from formamide, dialkylformamides, methanol, acetonitrile or halogenated aliphatic hydrocarbons.

4. The method as claimed in claim 2, wherein the compound of formula (2) in step (a) is a secondary amine, the reaction is carried out in the presence of a base selected from alkali metal carbonate, triethylamine, N,N-diisopropyl ethyl amine, trimethyl amine.

5. The method as claimed in claim 2, wherein the solvent used in step (b) is nitrile selected from acetonitrile or propionitrile.

6. The method as claimed in claim 2, wherein the solvent used in step (c) is polyethylene glycol-200 (PEG-200), methanol, dimethylformamide or acetonitrile.

7. The method as claimed in claim 2, wherein the solvent used in step (d) is selected from formamide, dialkylformamides, alcohol, nitriles or halogenated aliphatic hydrocarbons.

8. The method as claimed in claim 2, wherein base used in step (d) is selected from alkali metal carbonate, triethylamine, N,N-diisopropylethylamine, triethylamine, pyridine, or 1,8-diazabicyclo[5.4.0]undec-7-ene.

* * * * *